June 8, 1965
H. MORRIS ETAL
3,187,521
MECHANICAL COUPLING DEVICE
Filed April 18, 1963
2 Sheets-Sheet 1
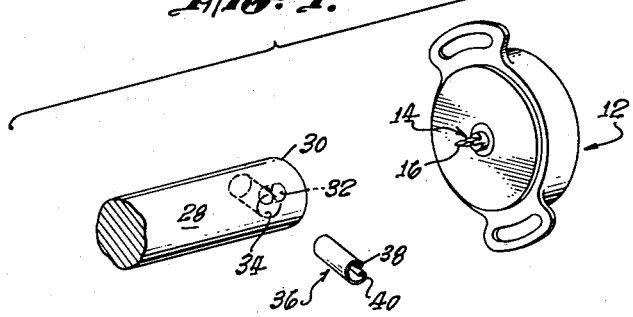
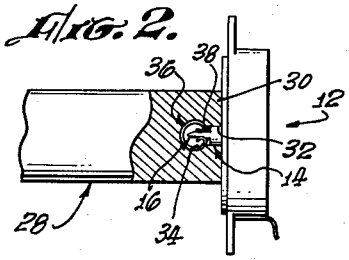
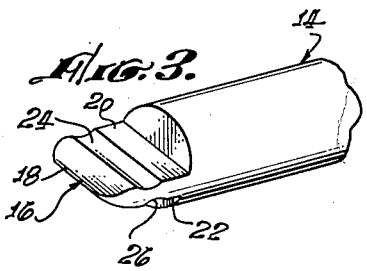
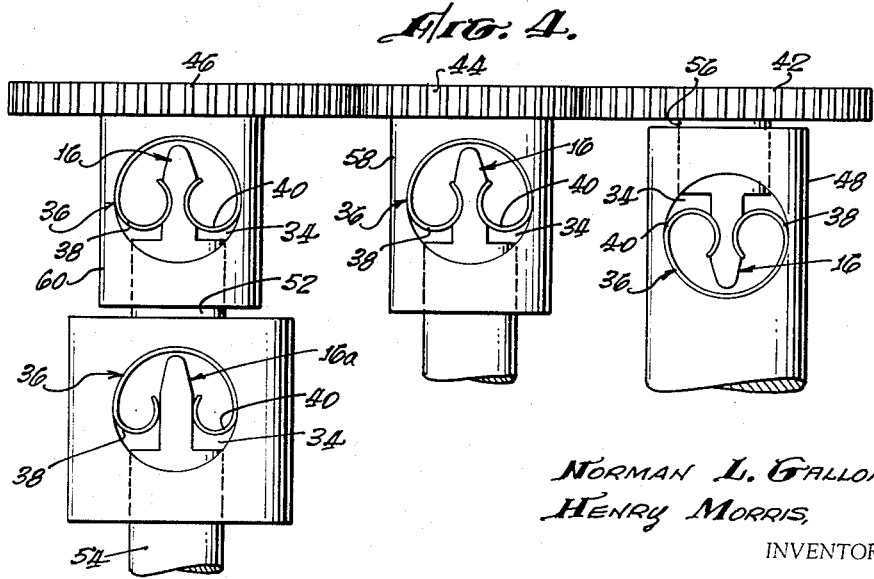
NORMAN L. GALLON,
HENRY MORRIS,
INVENTORS
BY *John H. Hazelwood*
ATTORNEY.

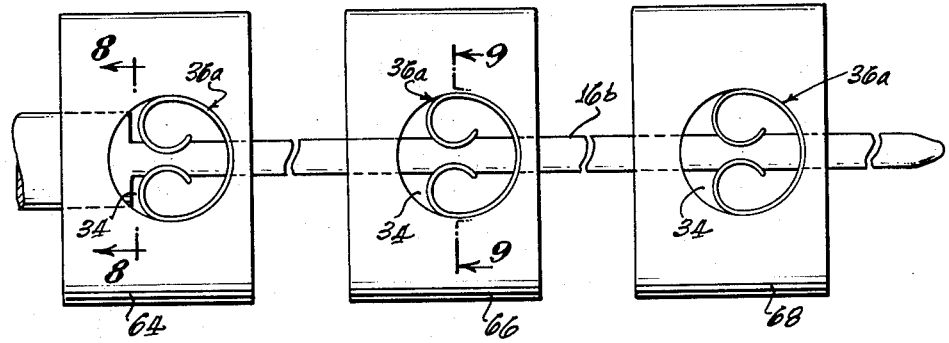
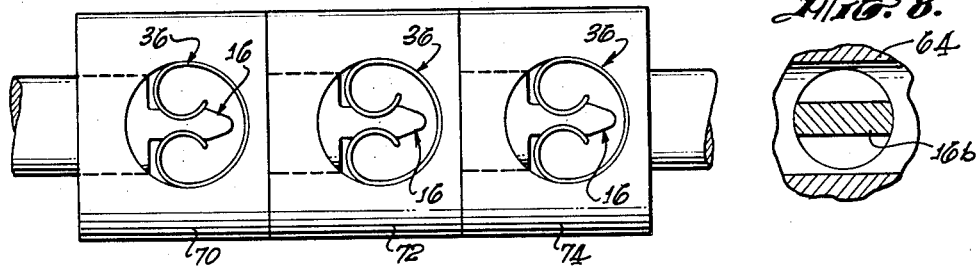
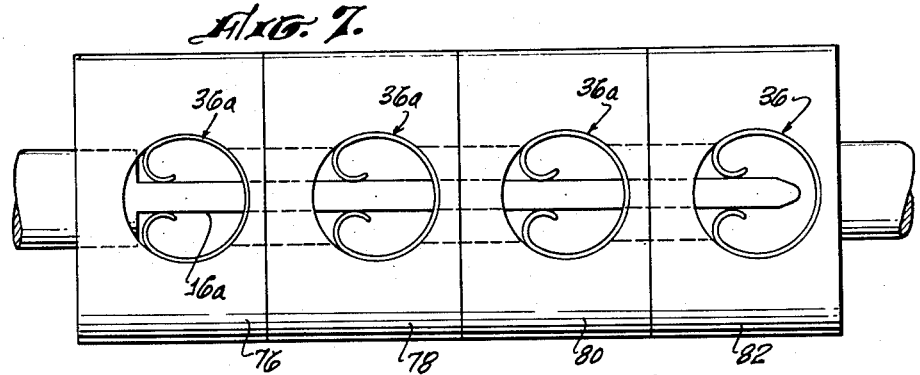
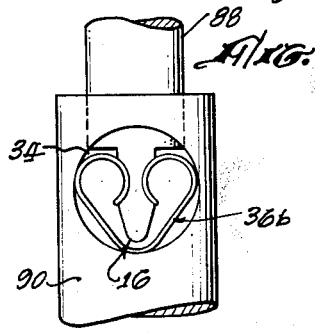
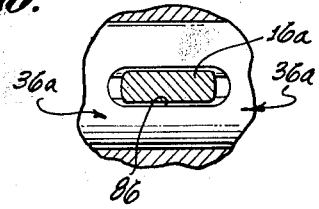

3,187,521
MECHANICAL COUPLING DEVICE
Henry Morris, Covina, and Norman L. Gallon, Pomona, Calif., assignors to General Dynamics Corporation, San Diego, Calif., a corporation of Delaware
Filed Apr. 18, 1963, Ser. No. 274,936
10 Claims. (Cl. 64—23)

This invention relates in general to coupling devices and more particularly to improved means for the rapid coupling of two or more shafts in axial alignment.

In installations where it is necessary that mechanical movements be accomplished positively, precisely, and reliably within a limited space envelope, it is frequently essential to employ devices for the coupling of rotatably mounted shaft members. It is an object of this invention to provide a coupling device well adapted to such installations which provides for the positive coupling of shafts in precise axial alignment while at the same time minimizing backlash and permitting limited relative axial movement between the coupled shafts.

It is another object of this invention to provide a coupling device which is susceptible to rapid and ready connection and disconnection from a shaft coupling position without adverse effect to the coupled shafts.

It is yet another object of the invention to provide a coupling device which is simple and economical to construct, employing a minimum number of easily fabricated, light weight parts and which is adapted to a wide variety of applications.

Still another object of this invention is to provide a coupling device, as described, which permits rapid connection of a number of separate, rotatable elements for unit rotation.

It is further an object of this invention to provide a coupling device, as described, which although providing positive coupling of shafts in precise axial alignment, is nevertheless adapted to production with proven, available production techniques, tooling and apparatus, and in which production tolerances are accommodated by providing for limited relative axial movement between the coupled shafts.

Other objects and advantages of the invention will become apparent from the following description, taken in conjunction with the drawings in which:

FIG. 1 is a view exploded to illustrate an embodiment of the invention employed in conjunction with a potentiometer;

FIG. 2 is a view, partially in cross section, of the invention embodiment of FIG. 1;

FIG. 3 is a fragmentary view in perspective of the coupled end of the potentiometer shaft illustrating the shaft end reduced to define the tongue element employed in the invention;

FIG. 4 is a view in side elevation of an embodiment of the invention employed in a quick-change gear reducer;

FIG. 5 is a view in side elevation of an embodiment coupling a plurality of rotary components for unit rotation;

FIG. 6 is a view in side elevation of an embodiment of the invention employed to couple rotary components of complemental male-female configurations;

FIG. 7 is a view in side elevation of an embodiment employing a modified tongue element;

FIG. 8 is a view in cross section taken on the line 8—8 of FIG. 5;

FIG. 9 is a view in cross section taken on line 9—9 of FIG. 5; and

FIG. 10 is a view in side elevation illustrating an embodiment of the invention employing a retainer element of modified shape.

Briefly described, a preferred embodiment of the coupling device of this invention comprises a first shaft at its coupling end shaped to define a tongue-like transverse portion and a second shaft provided with an axial recess for receipt of such portion in coaxial relationship. A transverse aperture penetrates the second shaft to traverse its axial recess and provide for compressible insertion therein of a resilient retainer member shaped with bifurcations to embrace the first shaft tongue and to transmit torque between the coupled shafts. Thus, in FIG. 1 of the drawing there is shown a potentiometer 12 provided with a rotatably disposed cylindrical or first shaft 14 which, as more clearly shown in FIG. 3, is reduced at its protruding end to form a transverse, diametrically-extending integral tongue, generally designated by the numeral 16. The tongue is tapered or radiused at its nose portion 18 both transversely and longitudinally. Adjacent and to the rear of the nose portion there is provided in either tongue surface 20 and 22 spaced apart detenting channels 24 and 26 paralleling the tongue longitudinal axis, for purposes presently described.

In FIG. 2 a second cylindrical shaft 28 is shown adapted for coaxial coupling to the first shaft 14, being connected at one end to an operating element (not shown) and at its illustrated other or coupling end 30 being provided with an axially disposed pilot bore or recess 32. The diameter of bore 32 permits reception in close fitting relationship of shaft 14. Although the description herein is directed to an embodiment employing cylindrical shafts, it is to be understood that shafts of other than circular cross section may be employed and the axial recess 32 shaped for receipt thereof to fix shaft axial alignment. Further, it may be visualized that the recess 32 and the tongue may be correspondingly offset from axial position, nevertheless effecting axial alignment of the coupled shafts. A retainer aperture 34 extends diametrically of shaft 28, intersecting pilot bore 32 at its inner end and receiving in diametrical traversing relationship the tongue 16.

In FIGS. 1 and 2 there is illustrated the resilient retainer or clip member 36 employed in securing shafts 14 and 28 in the coupled relationship of FIG. 2. The retainer 36 is of generally cylindrical shape but is broken along one wall and throughout its length to form inturned, curved bifurcations or fingers 38 and 40 such that the retainer in general appearance resembles that of a scroll. The bifurcations are shaped for complemental reception in tongue detenting channels 24 and 26 when the retainer 36 is received within the aperture 34. The respective diameters of the retainer and the aperture 34 receptive of same are so dimensioned as to permit tight fitting of the retainer within the aperture when the retainer is compressed and the gap between its bifurcations reduced. This latter gap is reduced in compressing the retainer to a distance less than the minimum distance between detenting channels 24 and 26 for reasons presently apparent. Thus, in the unrestrained condition of FIG. 1, the retainer clip 36 expands resiliently to an extreme transverse dimension substantially greater than such dimension in the assembled condition of FIG. 2. Not only does this assure retention of retainer 36 within the aperture 34 but assures, as well, a firm engagement of bifurcations or fingers 38 and 40 as same embrace and bear down upon tongue 16 through the medium of its detenting channels 24 and 26.

It is apparent that coupling of shafts 14 and 28 in axial alignment is quickly and easily accomplished by appropriately compressing resilient retainer 36 and inserting it into aperture 34 with the bifurcated and open side facing the pilot bore 32. The shaft 14 is fitted within the pilot bore 32 which thereby effects axial alignment of the two shafts 14 and 28. As the tongue 16 is received between the bifurcations 38 and 40 of the retainer, the tongue tapered nose portion 16 through a wedge action, spreads the resilient bifuractions apart. The bifuractions ultimately then fit within detenting channels 24 and 26 upon reaching positions of coincidence. The tongue 16 is thereby clamped and held by the resilient spring biasing forces developed between the bifuractions. It is apparent that the detenting arrangement serves as an additional restraint against relative axial movement between the coupled shafts 14 and 28. Notwithstanding, it may be desirable in some applications to eliminate the detenting feature, relaying simply on the spring forces, and in such cases the channels 24 and 26 are eliminate. In any event, it is apparent that transmission of shaft torque takes place through the retainer 36 with stress distributed over its unbroken curved wall surface abutting the surface of aperture 34 and over its curved bifurcation surfaces engaging the detenting channels or simply the tongue surfaces, where no such channels are employed. Further, it is to noted that the problem of backlash is substantially eliminated by such arrangement. Axial movement of the shafts relative to one another is constrained but not eliminated by the resilient bifurcations bearing upon the tongue 16.

In FIG. 4 the invention is shown embodied in a quick change gear reducer wherein are operably interengaged spur gears 42, 44, and 46, respectively connected to input shaft 48, idler shaft 50, and output shaft 52, the latter in turn coupled to a second output shaft 54. It will be observed that there is employed in all but the latter connection a similar tapered, detented tongue 16, resiliently retained between the curved bifurcations of a retainer 36. In coupling shafts 52 and 54, however, a non-detented tongue 16a is utilized. The adaptability of the invention to various coupling applications is apparent here as the tongue 16 variously appears on the hub 56 of spur gear 42 and on the shafts 50 and 52 mating respectively with the apertured hubs 58 and 60.

FIGURE 5 illustrates an arrangement utilizing an elongated transversely extending tongue 16b having flat upper and lower surfaces and detenting channels. The shaft tongue is passed through a plurality of rotary components 64, 66, and 68 axially aligned and coupled for unitary rotation. Each illustrated coupling employs a retainer 36a generally similar to the retainer above described and similarly bearing upon a tongue detenting channel surface. The retainers are, however, apertured at their unbroken sides to provide for passage of the tongue 16b therethrough, as shown in FIG. 8.

There is shown in FIG. 6 another invention application wherein a plurality of rotary components 70, 72, and 74 are coaxially coupled for unitary rotation by a male-female component lapping arrangement, similar to that shown in FIGS. 1 through 3. A further invention application is illustrated in FIG. 7 with four rotary components 76, 78, 80, and 82 coupled for rotation with flat surfaced tongue 16a. The arrangement is similar to that of FIG. 5 with retainers 36a provided with slots 86 for passage of the tongue. One point of difference will be noted, however; the tongue 16a is not provided with any detenting channels, and is thus similar to the tongue 16a of FIG. 4.

In FIG. 10 there is illustrated a modification of the retainer which is designated therein as 36b. In lieu of the generally cylindrical shape employed in the retainer 36 heretofore described, there is here employed a wall of general V-shape cross section curved at its apex and provided with the same curved bifurcations or fingers above described which are adapted for reception within the detenting channels of a tongue 16. Effective coupling for the shafts 88 and 90 is thus provided. Such a clip may, in certain instances, be preferable from an ease-of-fabrication standpoint. Otherwise, it functions in a generally similar fashion to retainer 36, although stress distribution over the shaft 88 is accomplished over a somewhat smaller area than with the fully circular retainer 36.

From the above description, it is apparent that the connecting means provided by this invention is a simple and effective means for accomplishing shaft coupling and that it is adapted to a wide variety of coupling requirements. It will be appreciated that the embodiments of this invention as herein described may be altered, changed, or modified without departing from the scope of the invention herein claimed.

What we claim is:

1. Shaft coupling means, comprising:
    a first shaft at its coupling end reduced to define a diametrically extending protruding tongue having a nose portion tapered in longitudinal and transverse cross section and detenting channels to the rear of said nose portion;
    a second shaft having an axially disposed pilot bore for receipt of said tongue in coaxial relationship and a diametrically extending retainer aperture traversing said pilot bore; and
    a resilient retainer member having inturned, curved bifurcations having a scroll-like configuration and which is receivable within said retainer aperture to embrace and through said bifurcations engage said first shaft tongue received within said second shaft pilot bore, said bifurcations respectively received in and bearing upon said detenting channels thereby to couple the first and second shafts while providing for their limited relative axial movement.

2. Shaft coupling means, comprising:
    a first shaft at its coupling end reduced to define a diametrically extending protruding tongue having a tapered nose portion and detenting channels adjacent said nose portion;
    a second shaft having an axially disposed pilot bore for receipt of said tongue in coaxial relationship and a diametrically extending retainer aperture traversing said pilot bore; and
    a resilient retainer member having inturned, curved bifurcations which define a scroll configuration and which is receivable within said retainer aperture to embrace and through said bifurcations engage said first shaft tongue received within said second shaft pilot bore, said bifurcations respectively received in and bearing upon said detenting channels thereby to couple the first and second shafts while providing for their limited relative axial movement.

3. Shaft coupling means, comprising:
    a first shaft at its coupling end reduced to define a diametrically extending protruding tongue provided with detenting channels;
    a second shaft having an axially disposed pilot bore for receipt of said tongue in coaxial relationship and a diametrically extending retainer aperture traversing said pilot bore; and
    a resilient retainer member having inturned, curved bifurcations defining a scroll-like configuration and which is receivable within said retainer aperture to embrace and through said bifurcations engage said first shaft tongue received within said second shaft pilot bore, said bifurcations respectively received in and bearing upon said detenting channels thereby to couple the first and second shafts while providing for their limited relative axial movement.

4. Shaft coupling means, comprising:
    a first shaft at its coupling end shaped to define a transversely extending tongue;
    a second shaft having a pilot recess for receipt of said tongue and a retainer aperture traversing said pilot recess; and
    a retainer member having a configuration in the form of a scroll receivable within said retainer aperture to engage said first shaft tongue received within said shaft recess, said tongue being received intermediate end portions of said retainer member thereby to couple the first and second shafts in axial alignment.

5. The coupling means of claim 4, wherein said retainer member is resilient thereby to permit of its compressible insertion within said aperture and limited relative axial movement of said shafts.

6. The coupling means of claim 4, wherein said tongue is provided with a detenting recess and said retainer member end portions engages said second shaft through receipt in said detenting recess.

7. Shaft coupling means, comprising:
a first shaft at its coupling end shaped to define a transversely extending tongue;
a second shaft having a pilot recess for receipt of said tongue and a retainer aperture traversing said pilot recess; and
a retainer member receivable within said retainer aperture to engage said first shaft tongue received within said shaft recess thereby to couple the first and second shafts in axial alignment, said retainer member being provided with a slot in one wall to permit the passage of said tongue therethrough, said retainer member being of a scroll shape with engagement of the said tongue through the curved fingers thereof, and wherein said slot extends through the otherwise unbroken retainer wall.

8. A device for coupling shafts in coaxial alignment and for constraining relative movement therebetween comprising: first and second shafts, the first shaft having a recess in one end thereof and an aperture traversing said recess, the second shaft having an end shaped to extend into the recess of said first shaft, and a resilient retainer member receivable within said aperture to engage said shaped end, said member having a curved central portion defining a first area, and end portions each inwardly curved to define an area within said first area of lesser diameter than said first area.

9. A resilient retainer for interconnecting and for constraining relative movement between a pair of coaxially aligned shafts, one of said shafts having an end portion extending into a recess of the other shaft, said other shaft including an aperture traversing the recess, said retainer being positioned in said aperture to engage the end portion of said one shaft, said retainer having a scroll-like configuration and comprising a member curved so as to define a first area, and end portions each curved so as to define smaller diameter areas within said first area, at least a portion of said end portions being adapted to abut against one of the associated shafts and at least a portion of the member defining the said first area being adapted to abut against the other of the associated shafts.

10. A resilient retainer for releasably interconnecting a pair of coaxially aligned shafts and for resisting relative movement between the shafts comprising: a member having the central portion thereof curved about a predetermined radius, and having the end portions thereof each curved in a direction similar to the direction of curvature of the central portion and about a smaller radius, whereby each of said curved portions cooperates to oppose changes in the curvature of any of the curved portions, said shafts being constructed so that one shaft extends into the other shaft, the other shaft having an aperture therethrough which traverses the extending portion of said one shaft, said retainer member being located in said aperture to engage the extending shaft portion.

References Cited by the Examiner

UNITED STATES PATENTS

| | | | |
|---|---|---|---|
| 1,052,007 | 2/13 | McMillan | 279—79 |
| 1,909,353 | 5/33 | Hughes et al. | 64—4 |
| 2,100,232 | 11/37 | Barry. | |
| 2,147,163 | 2/39 | Jimerson | 279—97 |
| 2,688,857 | 9/54 | Jones | 64—4 |
| 2,796,662 | 6/57 | Saum | 269—254 X |
| 2,941,827 | 6/60 | Parsons | 287—126 |
| 3,035,191 | 5/62 | Kent | 64—15 X |

ROBERT C. RIORDON, *Primary Examiner.*